(No Model.) 2 Sheets—Sheet 1.
C. M. CONRADSON.
CHUCK.
No. 489,934. Patented Jan. 17, 1893.
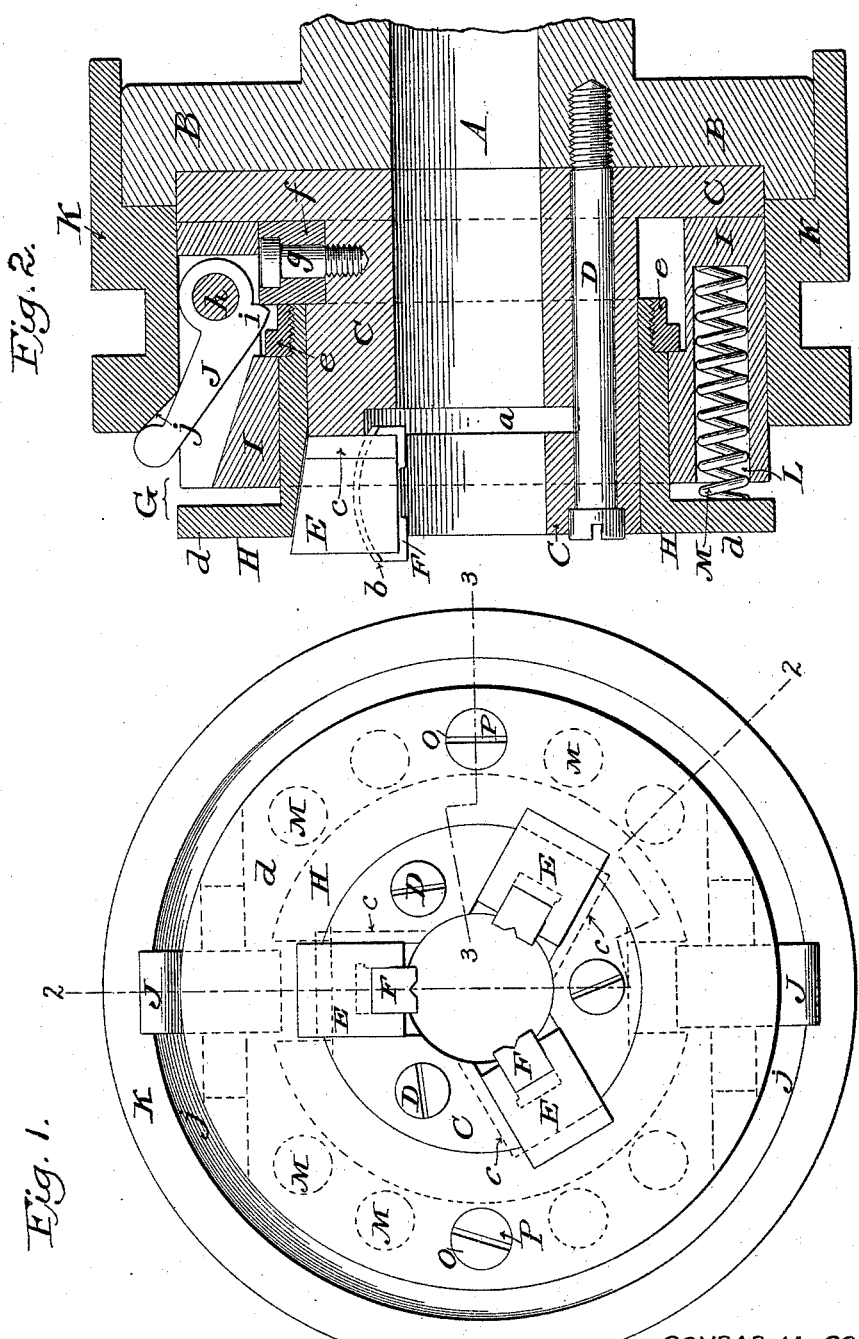
Witnesses:
James F. Duhamel
Horace A. Dodge.
CONRAD M. CONRADSON,
Inventor,
by Dodge Sons
Attys.

(No Model.) 2 Sheets—Sheet 2.

C. M. CONRADSON.
CHUCK.

No. 489,934. Patented Jan. 17, 1893.

Witnesses:
James F. Duhamel
Horace A. Dodge.

CONRAD M. CONRADSON,
Inventor.
by Dodge & Sons,
Attys.

UNITED STATES PATENT OFFICE.

CONRAD M. CONRADSON, OF MADISON, WISCONSIN.

CHUCK.

SPECIFICATION forming part of Letters Patent No. 489,934, dated January 17, 1893.

Application filed April 28, 1892. Serial No. 430,985. (No model.)

*To all whom it may concern:*

Be it known that I, CONRAD M. CONRADSON, a citizen of the United States, residing at Madison, in the county of Dane and State of Wisconsin, have invented certain new and useful Improvements in Chucks, of which the following is a specification.

My invention relates to chucks, designed more particularly for screw machines, and consists in the various features, details, and combinations hereinafter set forth and claimed.

Figure 3:
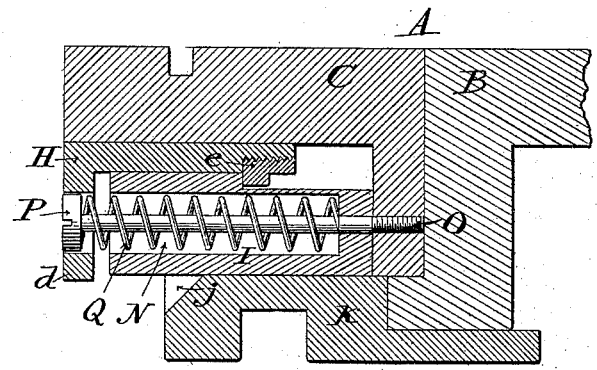
Figure 4:
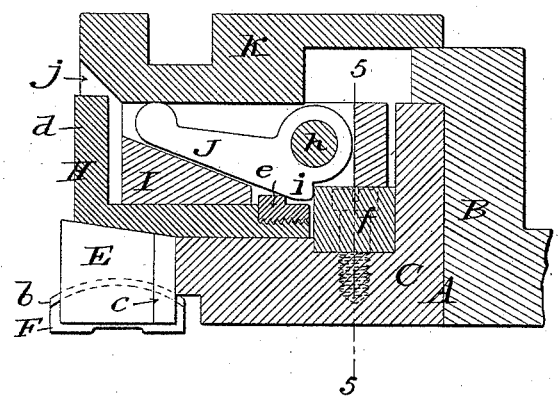
Figure 5:
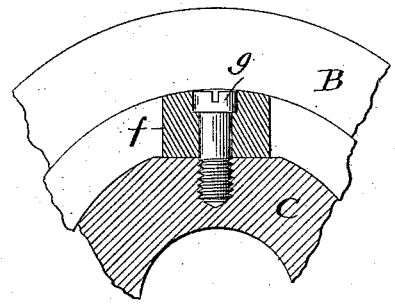

In the drawings,—Figure 1 is a front face view of my improved chuck; Fig. 2, a vertical longitudinal sectional view on the line 2—2 of Fig. 1, showing the sliding shell moved backward and the jaws released; Fig. 3, a longitudinal sectional view on the line 3—3 of Fig. 1; Fig. 4, a longitudinal sectional view showing the sliding shell moved forward and jaws closed upon the stock or rod to be grasped; and Fig. 5, a sectional view on the line 5—5 of Fig. 4.

A indicates the body of the chuck, which in the present instance is made or provided with a longitudinal opening from front to rear to permit the rod or stock to be grasped, to be passed lengthwise through the hollow arbor. This opening need not, however, extend entirely through the chuck-body except when the chuck is used upon screw machines or similar machines employing a hollow arbor through which the stock is fed.

The body A is made up of what may be termed two flanged sleeves or collars B and C, set with their flanges together, and united by the long screws D, as shown in Fig. 2. On the inner face of sleeve or tube C, near its outer end is a groove $a$ for a purpose presently explained, while in the outer ends of the sleeve are formed two or more (preferably three) radial slots in which are mounted the jaws E. These jaws have in their inner ends, each a curved seat to receive the rocking shoes F whose outer faces are curved to conform to the seats,—the curvature extending in the direction of the axis of the chuck. On the side face of the shoes, I form a rib $b$ to enter a corresponding groove in the jaws to guide them in their movements and prevent their falling from their seats in the jaws. The jaws are provided on one of their side faces each with a rib $c$ to enter a corresponding groove formed in the sides walls of the radial slots, so as to prevent the jaws from moving in other than radial lines.

The outer ends of the jaws E are beveled or inclined slightly so that, as a ring G encircling the sleeve C, is moved forwardly over the ends of the jaws, the latter will be forced inward radially to grasp the rod or stock. As the inner ends of the shoes project beyond the inner faces of the jaws, I provide the groove $a$ before referred to, to permit of a free adjustment of the shoes and their movement radially.

The ring G which encircles the sleeve C is a two-part ring, comprising the sections H and I, adapted to slide, one in relation to the other, and both, relatively over the sleeve or chuck-body. Section H, which is next to the sleeve or chuck-body, has at its outer end a lateral flange, $d$, of a diameter equal to or greater than the section I, and at its inner end a collar or flange $e$, as shown in Figs. 2, 3 and 4. The inward movement of section H is limited by the blocks $f$, (secured to sleeve or body C by screws $g$ shown in Figs. 2, 4 and 5) while the inward movement of section I is limited by the flange of the sleeve or body section C, as also shown in Fig. 2. That portion of the section H fitting over the outer ends of the jaws E is beveled or inclined to correspond to the bevel or inclination of the outer ends of the jaws, so that when the said section is moved outward the jaws will be forced inward, but when the section moves rearwardly the jaws will be released or lose their hold upon the stock. Section I which fits upon or encircles the section H is designed to move upon the latter between the collar or flange $e$ and the flange $d$; but extends rearward of the said section H as shown. The sections H and I always move together in one direction or the other but not to the same extent or degree; the section I moving a greater distance than the section H. The section I is slotted radially to receive one or more (preferably two) levers J which are pivoted at their inner ends upon the bolts or pivot pins $h$, as shown in Figs. 2 and 4. Each of these levers is provided on its inner face, in advance of its pivot, with a heel, lug, or projection $i$ which is designed to engage one of the blocks

*f* to which I have before referred; while the forward end or arm of each lever is designed,—when the levers are in the position shown in Fig. 2,—to project beyond the periphery of their section I to be acted upon by the sliding shell K having a beveled edge *j*. In the ring section I is found a series of sockets L, Fig. 2, in each of which is placed a coiled spring M which bears at one end against the bottom of the socket and at the opposite end against the rear face of the flange *d* of the section H. Upon reference to Fig. 1 it will be seen that I have represented by dotted lines eight of these springs, but of course do not restrict myself to any particular number. These springs tend to urge the section H outward away from the section I, and the jaws against the stock. There is also found in the section I one or more (preferably two) sockets N (see Fig. 3) through which passes the long screw O, the inner end of which screws into the flange of the body-section C, while the outer end projects through a hole or opening in the flange *d* of the ring section H where it is provided with a head or enlargement P. Between the inner face of this head P and the bottom wall of the socket N, the screw O is encircled by a coiled spring Q which tends to retract the two ring sections when the sliding shell is moved backward.

The operation of the chuck is as follows: The parts are brought to the position shown in Fig. 2, and the rod, stock, or other article to be grasped is placed between the inner ends of the jaws. The sliding shell K is now moved outward or forward and its beveled edge *j*, striking against the ends or arms of the levers J, rocks or tips the levers upon their pivots *h*. As the levers thus rock, the heels or projections *i* are thrown inward against the fixed blocks *f*, and as the levers continue to be moved inward by the shell, the heels or projections *i* act as fulcra and carry the ring section I forwardly as shown in Fig. 4. The springs M which are carried by the section I and bear upon the section H transmit the forward motion to the latter, and cause the said section to force the jaws inward toward each other, as already explained. The resistance offered to the jaws by the article to be clamped or grasped is sufficient to retard or lessen the movement of the ring section H relatively to the movement of the section I. When the shell K has been moved to the position shown in Fig. 4 the levers will be found wholly within the slots in the ring, and will be prevented from rocking upon their pivots and releasing the jaws by reason of the shell encircling them. When the shell is moved backward, the springs M return the two sections H and I to their proper relative positions, while the springs Q (owing to the engagement of section I with the shoulder *e* of section H) act upon the section I and return the ring as a whole to its normal position,—shown in Fig. 2,—and effect a release of the jaws.

Any suitable means may be employed for sliding the shell K. By mounting the shoes of the jaws in the manner shown they are permitted to adapt themselves to inequalities or bends in the stock.

Having thus described my invention, what I claim is,—

1. In a chuck, the combination with the hollow body, of the radial jaws, the encircling ring for actuating the jaws, the levers pivoted in the ring, and the sliding shell for actuating the levers.

2. In a chuck, the combination with the hollow body, of the radial jaws, the encircling ring for actuating the jaws the levers pivoted to the ring, the sliding shell for actuating the levers, and the springs, for returning the ring as a whole to its normal position.

3. In a chuck, the combination with the hollow body, of the radial jaws, the encircling two-part ring for actuating the jaws, the levers pivoted to the ring, the sliding shell for actuating the levers, and springs interposed between the two parts of the ring.

4. In a chuck, the combination with the hollow body, of the radial jaws, the encircling two-part ring and its interposed springs the levers pivoted to the ring, the sliding shell for actuating the levers, and the springs for returning the ring as a whole to its normal position.

5. In a chuck the combination with the hollow body, having the fixed blocks or abutments, of an encircling ring, jaws which are actuated by the ring, levers pivoted in the ring and provided each with a lug to engage the fixed blocks, and with a forwardly extending arm to project out through the ring, a sliding shell to bear upon the arms of the levers and rock them, and springs serving to retract the ring.

6. In a chuck, the combination with the hollow body, of the sliding ring-sections H I, the interposed springs M the radial jaws E actuated by the ring, the screws O secured to the chuck body and the springs Q applied to the screws O, all substantially as shown and described.

In witness whereof I hereunto set my hand in the presence of two witnesses.

CONRAD M. CONRADSON.

Witnesses:
V. M. HILL,
W. R. BAGLEY.